Figure 1:
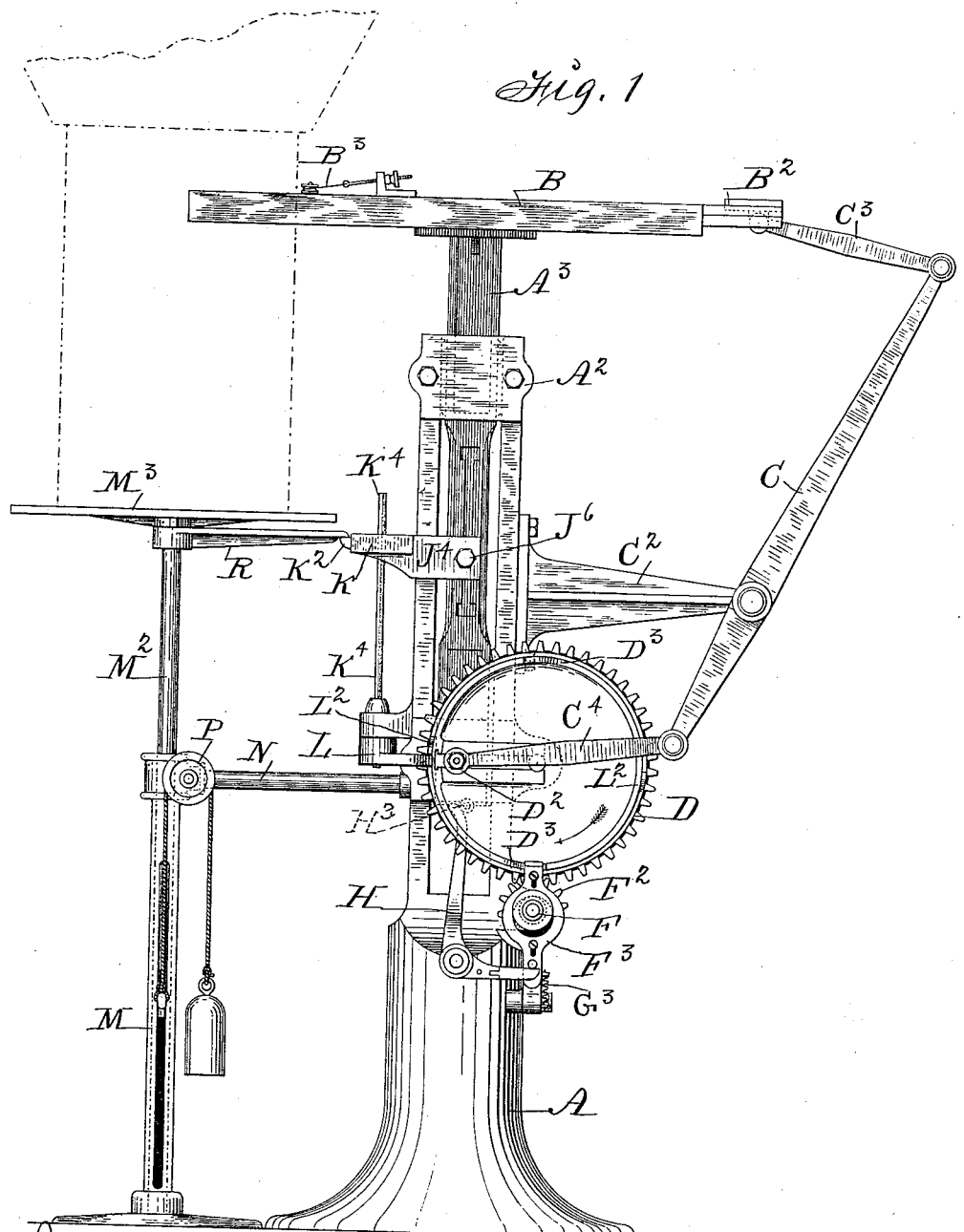

(No Model.)

2 Sheets—Sheet 1.

C. J. MERRILL & W. VIGGERS.
AUTOMATIC CUT-OFF AND TAKE-AWAY FOR DRAIN TILE MACHINES.

No. 332,546. Patented Dec. 15, 1885.

Witnesses:
R. H. Orwig.
M. T. Anderson.

Inventors: Calvin J. Merrill, William Viggers,
By Thomas G. Orwig, Atty.

(No Model.)  2 Sheets—Sheet 2.
C. J. MERRILL & W. VIGGERS.
AUTOMATIC CUT-OFF AND TAKE-AWAY FOR DRAIN TILE MACHINES.
No. 332,546. Patented Dec. 15, 1885.
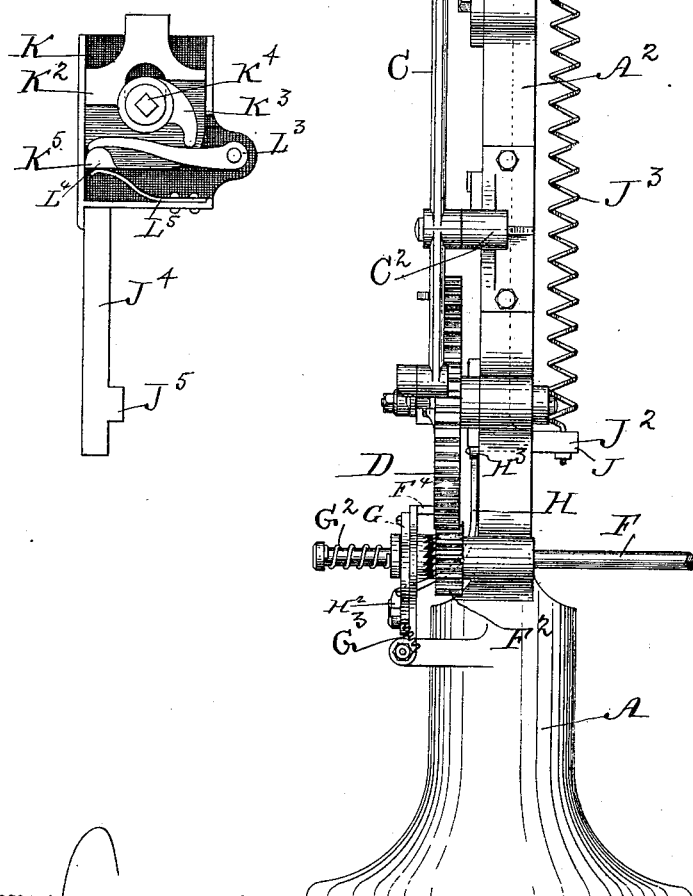

UNITED STATES PATENT OFFICE.

CALVIN J. MERRILL AND WILLIAM VIGGERS, OF DES MOINES, IOWA.

AUTOMATIC CUT-OFF AND TAKE-AWAY FOR DRAIN-TILE MACHINES.

SPECIFICATION forming part of Letters Patent No. 332,546, dated December 15, 1885.

Application filed November 8, 1884. Serial No. 147,451. (No model.)

*To all whom it may concern:*

Be it known that we, CALVIN J. MERRILL and WILLIAM VIGGERS, of Des Moines, in the county of Polk and State of Iowa, have invented an Automatic Cut-Off and Take-Away for Drain-Tile Machines, of which the following is a specification.

Heretofore rotary cut-offs and tile-delivering devices have been combined with tile-machines; but in no instance has an intermittent reciprocating rectilinear motion been automatically imparted to a cut-off in concert with the vertical movements of a take-away or tile-delivering platform as contemplated by our invention, which is illustrated by the accompanying drawings, in which—

Figure 1 is a side view of our complete device; Fig. 2, a view taken at right angles relative to Fig. 1, and Fig. 3 an enlarged detail view of a latch that forms an intermittent connection between the cut-off and the take-away.

A is a post that has a broad base, adapting it to be placed stationary upon a floor. It is bifurcated at its upper portion.

$A^2$ are bearings fixed to the top ends of the post to guide an auxiliary post, $A^3$, that is fitted in those bearings to move up and down relative to the post A.

D is a frame fixed to the top of the auxiliary post $A^3$ to support a sliding cut-off.

$B^2$ is a sliding frame fitted in bearings formed in the sides of the frame B.

$B^3$ is a wire stretched across the sliding frame in such a manner that its tension can be readily regulated by means of a screw, or in any suitable way, as required, to serve as a cutter for severing tile from the clay tube.

C is a lever secured to the post A by means of a bearer, $C^2$. Its top end is connected with the sliding frame $B^2$ by means of a pitman, $C^3$, and with a drive-wheel at its lower end by means of a connecting-rod, $C^4$.

D is a drive-wheel mounted in bearings formed on or fixed to the post A. The rod $C^4$ is adjustably connected with the wheel by means of a sliding crank-pin, $D^2$, as required, to vary the length of the stroke of the lever C to cut off tile of different diameters.

F is a shaft that has a bearing formed on or fixed to the post A, and is designed to be connected with the driving mechanism of the complete machine in such a manner that it will rotate continuously when the machine is in operation.

$F^2$ is a pinion placed loosely upon the shaft F. It has clutch-teeth formed on or fixed to its outside surface.

$F^3$ is a clutch that slides upon the shaft, and is hinged to the post A by means of an extension on its lower side, as clearly shown in Fig. 1. An extension, $F^4$, on its upper side terminates in a cam that extends laterally to be engaged by cams $D^3$ on the wheel D. As these cams $F^4$ and $D^3$ come in contact the hinged clutch will be disengaged from the pinion, and the wheel D and the cut-off mechanism will be retained dormant until the clay tube has descended far enough to allow another tile to be cut therefrom.

G is a latch device in the form of a sliding collar, placed in an annular groove formed in the clutch $F^3$. It has an elongated opening, and is fastened to the extensions on the clutch by means of screws passed through slots.

$G^2$ is a spring placed on the shaft in such a manner that in its normal condition it will press the sliding and hinged clutch F against the toothed side face of the pinion.

$G^3$ is a spring that will in its normal condition hold the sliding device G down.

H is an elbow-shaped lever, pivoted to the post A in such a manner that when it is vibrated its lower end will engage a stud, $H^2$, on the sliding latch G and press the latch up into concentric position relative to the clutch $F^3$, that will then slide on the shaft and engage the toothed side face of the pinion $F^2$, as required, to lock the pinion to the driving-shaft and to impart intermittent motion to the wheel D and the cut-off mechanism. The end of the lever H that engages the stud $H^2$ is jointed and flexible, as required, to accommodate itself to the motion of the hinged clutch.

$H^3$ is a stud or roller carried on the lower end of the auxiliary post $A^3$ in such a manner that when the post descends the stud will engage the top end of the lever H and actuate it, as required, to operate the sliding latch device G.

S is a lateral extension at the lower end of the sliding post $A^3$.

$J^2$ is a corresponding extension at the top of the post A.

$J^3$ is a spring fixed to those extensions in such a manner that it will in its normal condition keep the auxiliary post and cut-off at its top elevated.

J⁴ is a latch-bearer adjustably fixed to the post A³ by means of a lug, J⁵, that extends into a groove formed in the post and a clamping-screw, J⁶.

K is a latch-case formed on or fixed to the free end of the bearer J⁶.

K² is a sliding latch in the case.

K³ (clearly shown in Fig. 3, from which the cover of the case is removed,) is a cam through which a spindle, K⁴, extends from a step, K⁵, formed on or fixed to the post A.

L is a crank fixed to the lower end of the spindle K⁴.

L² are cams projecting from the face of the wheel D, that engage the end of the crank L, as required, to turn the spindle K⁴ and the cam K³ to draw the latch into the case.

L is a lever pivoted to the case in such a manner that it will engage a spur, L⁴, on the rear end of the latch and move the latch when the cam on the spindle is pressed against the lever.

L⁵ is a spring fixed in the rear end of the case to throw the latch forward when the backward pressure is relaxed.

M is a tubular post fixed at the side of the post A.

M² is a telescopic extension that carries a platform, M³, at its top.

N is a brace connecting the two posts A and M.

P is a pulley at the top of the post M. A rope is connected with the lower end of the extension M² by means of an eye that projects therefrom through a slot in the post A and passed over the pulley. A weight attached to the end of the rope elevates the extension M² and the platform M³ whenever a tile is removed from the platform.

R is an arm fixed to the extension M² in such a manner that it will in its downward movements engage the projecting end of the latch K², and thereby depress the auxiliary post A³ and carry it and its attachments along until the stud H³ comes in contact with the lever H and actuates that lever, as required, to release the hinged clutch F³, and to thereby transmit power from the shaft F to the wheel D, by means of which the cut-off mechanism is operated and a tile cut from the clay tube that rests upon and depresses the platform M³, and when one of the cams D³ on the wheel comes in contact with the upper extension, F⁴, of the hinged clutch it will disengage it from the pinion F² and arrest the motion of the wheel. At each intermittent motion of the wheel one of the cams L² comes in contact with the cam L on the spindle K⁴, and thereby actuates the latch K², as required, to free the post A³ and its attachments from the arm R, so that the power stored in the spring J³ will be released to lift the cut-off mechanism to its normal position. By adjusting the latch-bearer J⁴ relative to the arm R the length of the tile cut-off may be regulated, as required, to vary the length in accordance with the diameter and to produce uniform lengths in tile of the same diameter. When a tile is cut off from the clay tube projected from the dod on the end of the cylinder of a machine, as indicated by dotted lines in Fig. 1, its entire weight will rest upon the platform M³ and descend rapidly with the platform, as required, to take it away from the clay tube. As quick as the complete tile is removed from the platform by an attendant the weight connected with the extension of the tubular post will again elevate the platform to engage and support the suspended end of the clay tube, and thus the cut-off and take-away will be automatically operated in concert with each other and the machine.

We claim as our invention—

1. In a drain-tile machine, the combination of a post or vertical frame, a horizontal frame or bearing fixed to the post or vertical frame, a reciprocating frame carrying a cutter on the horizontal frame, and a lever connected with the reciprocating cutter carrier or frame at one end by means of a pitman, and with an intermittent rotary wheel at its opposite end by means of a rod and crank-pin, to operate in the manner set forth.

2. The bifurcated post A, the auxiliary post A³, the fixed frame B, the reciprocating frame and cutter-carrier B², the lever C, and the wheel D, arranged and combined with a tile-machine for the purpose specified.

3. The clutch device F³ F⁴, in combination with the pinion F², the shaft F, and the wheel D, having cams D², substantially as shown and described, for the purposes specified.

4. The latch device G, in combination with the clutch F³ and the lever H, substantially as shown and described, for the purposes stated.

5. The combination of a sliding post, A³, having a stud, H³, a lever, H, and a clutch-latching device, G, substantially as shown and described, for the purposes stated.

6. The combination of the bearer J⁴, carrying a sliding latch in a case, the latch-operating spindle K⁴, having a crank, L, the wheel D, having cams L², a vertically-reciprocating cut-off carrier, and a parallel vertically-reciprocating platform-carrier having an arm, R, to operate in the manner set forth, for the purposes stated.

7. The combination of a frame or post, A, a driving-shaft, F, a loose pinion, F², an adjustable clutch having a cam, F⁴, a drive-wheel, D, having cams D³, a lever, H, a vertically-adjustable post, A³, carrying a horizontal reciprocating cut-off and a stud or roller, H³, and a beam or lever, C, connected with the cut-off and the wheel D, for the purpose specified.

8. The latch composed of a case, K, a slide, K², a cam, K³, a lever, L³, a stud, L⁴, a spring, L⁵, and an arm or bearer, J⁴, in combination with a cut-off carrier, a drive-wheel having a cam, $L^2$, and a spindle, $K^4$, having a crank, L, in a fixed bearing, $K^5$, for the purposes specified.

9. In an attachment for drain-tile machines, a frame or post, A, an auxiliary post, $A^3$, carrying a horizontally-reciprocating cut-off, a fixed arm, $C^2$, and a fixed latch-bearer, $J^4$, in which is a sliding latch, $K^2$, the wheel D, connected with the cut-off by the lever C, and pitmen $C^3$ $C^4$, in combination with a driving-shaft, F, and a parallel vertically-reciprocating platform-carrier having a fixed arm, R, and mechanism to operate the sliding latch $K^2$ at regular intervals, in the manner set forth, for the purposes specified.

CALVIN J. MERRILL.
WILLIAM VIGGERS.

Witnesses:
THOMAS G. ORWIG,
FOSHAY WALKER.